United States Patent
Rabelle

(12) 
(10) Patent No.: US 6,923,043 B2
(45) Date of Patent: Aug. 2, 2005

(54) METHOD AND DEVICE FOR DETECTING A LEAK IN A HEAT EXCHANGER, ESPECIALLY A PLATE-TYPE HEAT EXCHANGER

(75) Inventor: Gérard Rabelle, Roissy CDG Cedex (FR)

(73) Assignee: Tetra Laval Holdings & Finance S.A. (CH)

( * ) Notice: Subject to any disclaimer, the term of this patent is extended or adjusted under 35 U.S.C. 154(b) by 0 days.

(21) Appl. No.: 10/475,581

(22) PCT Filed: Apr. 10, 2002

(86) PCT No.: PCT/FR02/01256

§ 371 (c)(1),
(2), (4) Date: Dec. 15, 2003

(87) PCT Pub. No.: WO02/086438

PCT Pub. Date: Oct. 31, 2002

(65) Prior Publication Data

US 2004/0129061 A1 Jul. 8, 2004

(30) Foreign Application Priority Data

Apr. 23, 2001 (FR) .............................................. 01 05442

(51) Int. Cl.⁷ ................................................ G01M 3/04
(52) U.S. Cl. ...................................... 73/40.5 R; 73/40
(58) Field of Search .................................. 73/40.5 R, 40

(56) References Cited

U.S. PATENT DOCUMENTS

| | | | | |
|---|---|---|---|---|
| 3,400,753 A | * | 9/1968 | Slover | ......................... 165/285 |
| 3,425,264 A | * | 2/1969 | Frei | ......................... 73/40.5 R |
| 4,138,856 A | * | 2/1979 | Orlowski | ..................... 62/181 |
| 4,216,821 A | * | 8/1980 | Robin | ........................ 165/11.1 |
| 4,986,749 A | * | 1/1991 | Praat et al. | .................... 432/28 |
| 5,170,840 A | | 12/1992 | Grunwald | |
| 6,009,745 A | | 1/2000 | Dall et al. | |
| 6,035,700 A | * | 3/2000 | Shaw | ......................... 73/40.7 |
| 6,116,332 A | | 9/2000 | Vannman et al. | |
| 6,662,633 B2 | * | 12/2003 | Pratt | ........................ 73/40.5 R |
| 6,786,079 B2 | * | 9/2004 | Bucey et al. | ................ 73/49.2 |

FOREIGN PATENT DOCUMENTS

| | | |
|---|---|---|
| EP | 1 022 552 | 7/2000 |
| WO | WO 95/16900 | 6/1995 |

* cited by examiner

*Primary Examiner*—Michael Cygan
(74) *Attorney, Agent, or Firm*—Ostrolenk, Faber, Gerb & Soffen, LLP

(57) ABSTRACT

The invention relates to a device for detecting a leak between two circuits of a plate-type heat exchanger (1) provided with means for filling two circuits with fluid at a different pressure, characterized in that said device comprises automatic control means for the convergence of the pressure inside said circuits with respect to a given threshold, and means for signalling a leak when the automatic control means have detected the occurrence of said convergence.

7 Claims, 6 Drawing Sheets

Figure 7:
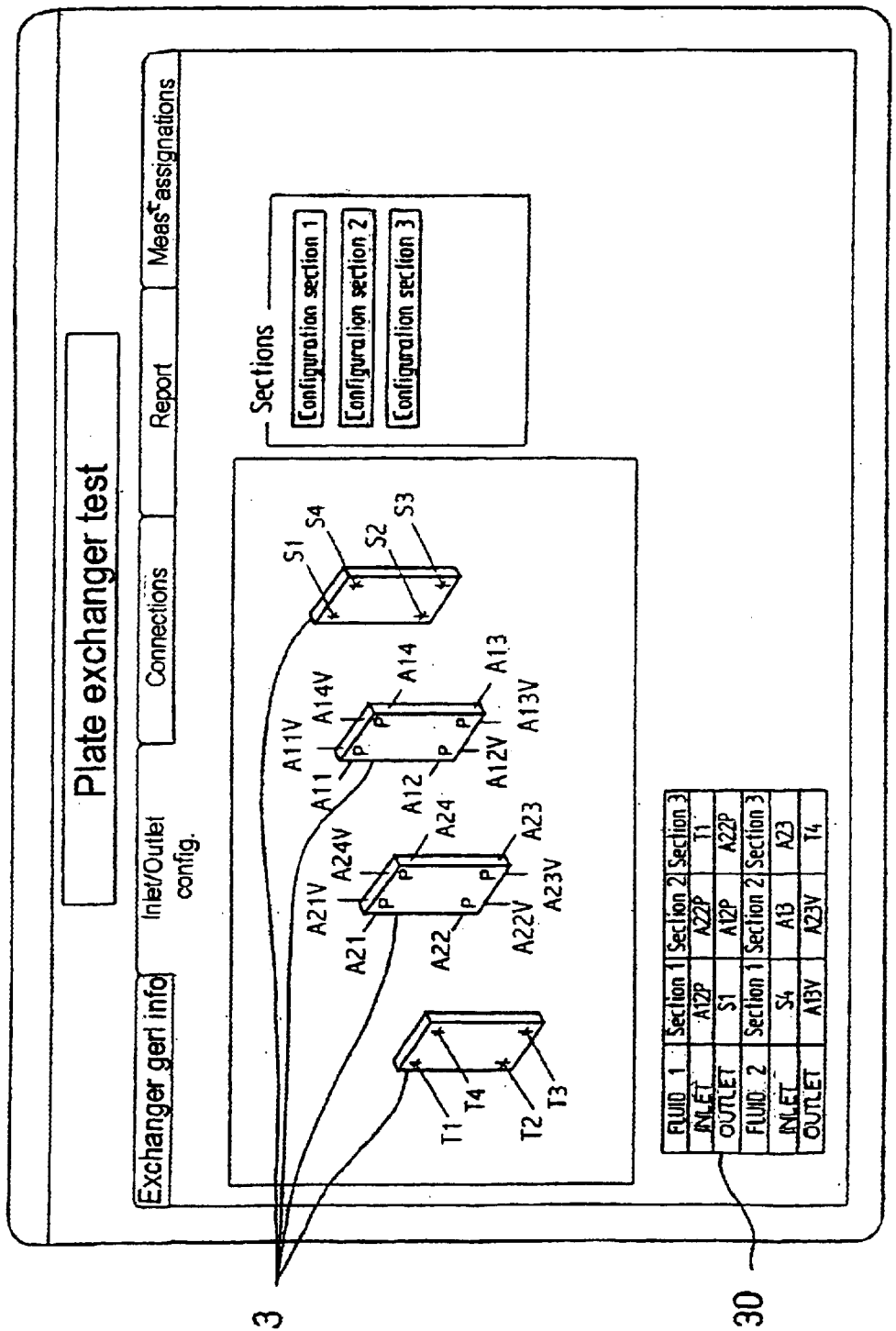

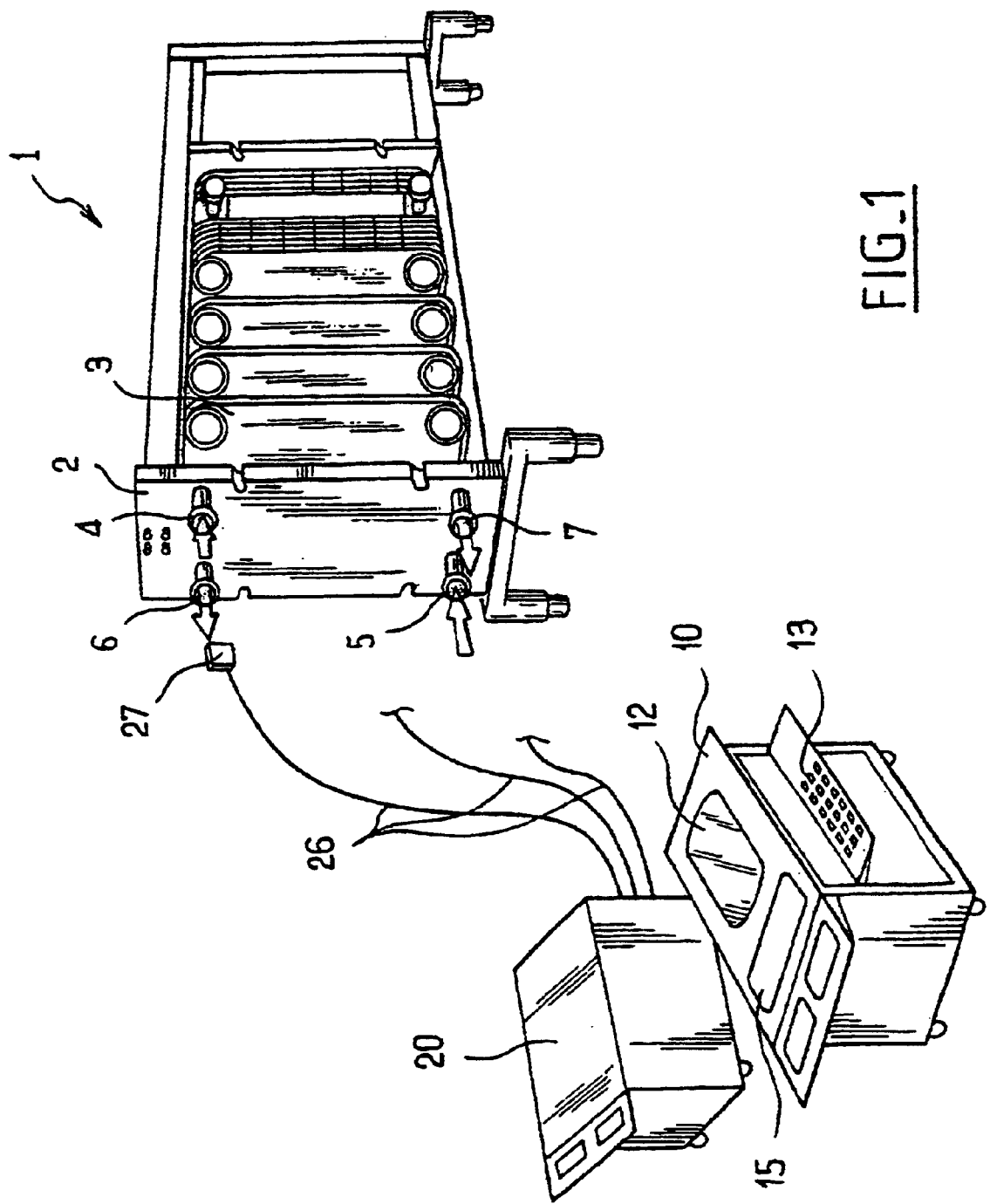
FIG_1

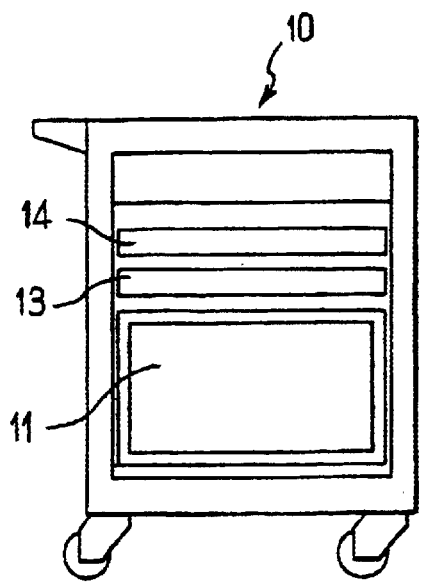
FIG_2
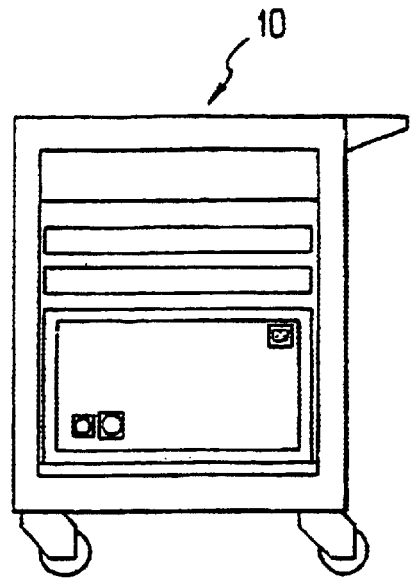
FIG_3
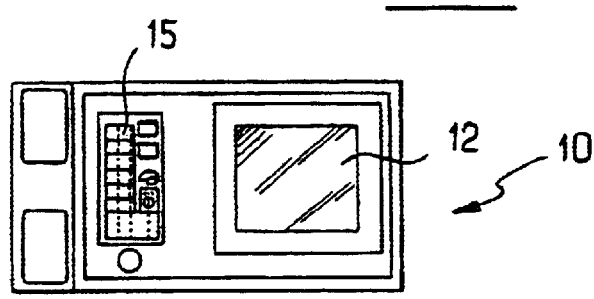
FIG_4
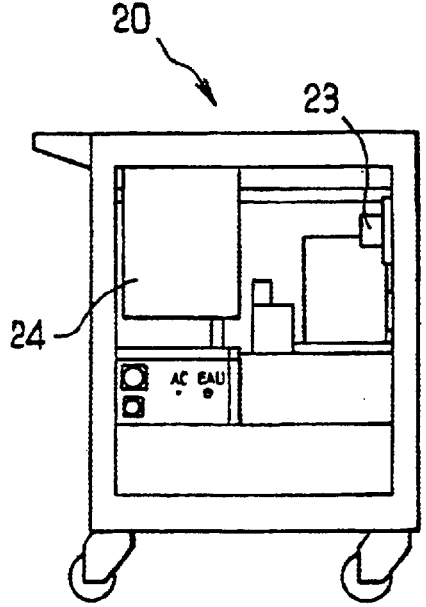
FIG_5
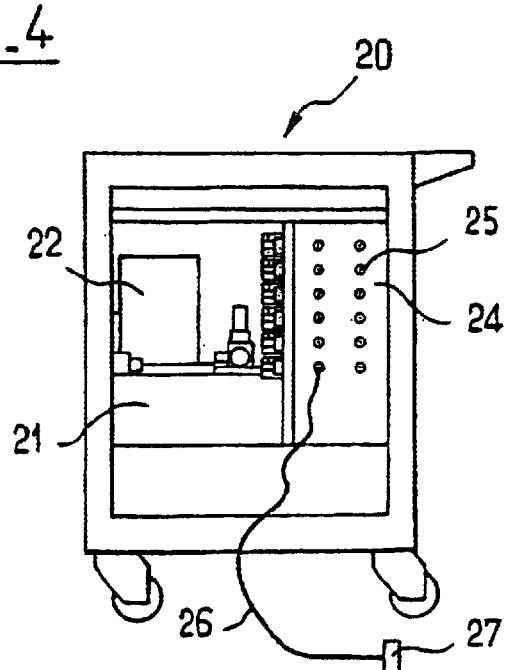
FIG_6

| | Exchanger genl info | Inlet/Outlet config. | Connections | Report | Meas't assignations |
|---|---|---|---|---|---|

Plate exchanger test

| | PRESSURE TEST Connect the outlet | To | Exchanger Pressure inlet to | Plate Plug on |
|---|---|---|---|---|
| Section 1 | F1S1 | ☞ | S1 to fixed plate | T1 on moving plate |
| Section 1 | F2S1 | ☞ | A13V to internal plate | S4 on fixed plate |
| Section 2 | F1S2 | ☞ | No external connections | A13 on intermed. plate 1 |
| Section 2 | F2S2 | ☞ | A23V to intermed. plate 2 | T4 on moving plate |
| Section 3 | F1S3 | ☞ | In series with F1S2 | |
| Section 3 | F2S3 | ☞ | A23 to intermed. plate 2 | |

FIG. 8

FIG. 9

METHOD AND DEVICE FOR DETECTING A LEAK IN A HEAT EXCHANGER, ESPECIALLY A PLATE-TYPE HEAT EXCHANGER

The invention relates to a method and to a device for detecting a leak in a heat exchanger for fluids, particularly in a plate-type heat exchanger, of the type used for processing milk.

A heat exchanger comprises a first circuit in which a first fluid can circulate, and a second fluid in which a second fluid can circulate, a significant proportion of the first and second circuits being in close contact to encourage heat exchange between the two fluids. Plate-type heat exchangers consist of several sections of several bundles of corrugated plates assembled by joints and are well suited to lengthy heat exchanges (reference may for example be made to patent U.S. Pat. No. 6,116,332 for an example of a plate-type exchanger). It is obviously of capital importance that the fluids of the two circuits not be in direct communication and is therefore appropriate periodically to check that there are not leaks from one circuit to the other.

Numerous methods and devices for detecting leaks, making it possible to avoid systematic disassembly and inspection of all the plates of the exchanger have already been proposed.

For example, according to a method described in document WO 95/16900, a saline solution is injected into one circuit and water is injected into the other, and measuring the conductivity of the water in the second circuit makes it possible to detect whether salt is passed from one circuit to the other, that is to say whether there is a leak. If there is, ultrasound inspection makes it possible to determine which plate is holed. Such a test takes time (generally about four hours) and has the disadvantage of not being predictive, in that it gives no information about the quality of the joints.

According to patent U.S. Pat. No. 6,009,745, a solvent solution is circulated through one circuit and a gas is circulated through the other; a differential pressure is established in the two circuits, and the appearance of a deposit of solute at the location of any leaks is visually observed. However, such a solution which requires visual inspection can hardly be used where leaks are hidden from sight.

According to patent U.S. Pat. No. 5,170,840, a solution of sulfamic acid is circulated through one circuit and a colored mixture of caustic soda and potassium permanganate is circulated through the other, and the colored leaks which may arise are observed. This solution has the same disadvantage as the previous one.

There is also a method whereby each circuit of each section is pressurized, section after section, and the change in pressure is observed, its pronounced drop in one circuit of one section indicating that there is a problem. Such a system is also time consuming to employ.

The object of the invention is to propose a new method (and the associated operating device) for detecting leaks, which does not have the disadvantages of the known methods and allows an exchanger to be tested more quickly and more easily.

The invention achieves its goal by virtue of a method for detecting a leak between the two circuits of a plate-type exchanger, of the type in which each of the two circuits is filled with fluid at a different pressure, characterized in that the change in pressure in the two circuits is observed and in that a converging of the pressures observed in the two circuits below a certain threshold is automatically monitored and in that a leak detected when said convergence has been detected is signaled. Advantageously, the difference between the two pressures is periodically calculated and a leak is signaled when the difference drops below a certain threshold.

The invention makes it possible to define several sections in the two circuits according to the connections of the inlets/outlets of the plates of the exchanger, and tests several sections of the exchanger simultaneously.

Advantageously, the connections to be made with a hydraulic test module to simultaneously test said several sections are automatically indicated.

The device for detecting a leak between the two circuits of a plate-type exchanger, of the type comprising means for filling each of the two circuits with fluid at a different pressure, is characterized in that it comprises means for automatically monitoring the convergence of the pressures in the two circuits with respect to a given threshold, and means for signaling a leak in function when the automatic monitoring means have noticed said convergence.

Advantageously, these monitoring means comprise means for measuring the differential pressure.

Advantageously, the device comprises a hydraulic module and an electronic module which are separate, the hydraulic module comprising a number of connections for connecting to a number of inlets/outlets of the plate-type exchanger so that several sections of the exchanger can be tested simultaneously.

Advantageously, the electronic module contains software for exploiting the pressure measurements determined at the connections of the hydraulic module.

Advantageously, the software indicates, on the basis of the configuration of the sections, which configuration is input as data, what connections are to be made at the connections in order to take the measurements.

Thus, according to the present invention, the two circuits are filled with fluid (and this fluid is preferably water, which has the advantage of not contaminating the circuits), the two circuits are pressurized in all sections at once, establishing a differential pressure therein, and any critical convergence of the pressure is observed in all the sections at once, by constant measuring of the pressure and by virtue of the software that exploits the measurements. The software built into the electronic module takes into account the configuration of the inputs/outputs defining the sections, and from this automatically deduces what connections need to be made for carrying out the test in the various sections; it then, by observing the test results, is able from this to deduce in which section or sections a leak has been detected.

The advantage of the invention is that it is possible to operate at the working pressure of the heat exchanger, thus making it possible to detect leaks under working conditions, or to perform a manufacturer test at a higher pressure (which makes it possible to increase to a pressure that also allows the joints to be checked). It also allows microcracks to be observed by adopting a higher observation pressure. This gives the test of the invention a predictive dimension. Given the speed of the test, the test can also be repeated reversing the differential pressure in the two circuits so as to force the microcracks to open up at least in one of the two directions, thus making it possible to detect certain types of unidirectional microcracks.

Figure 10:
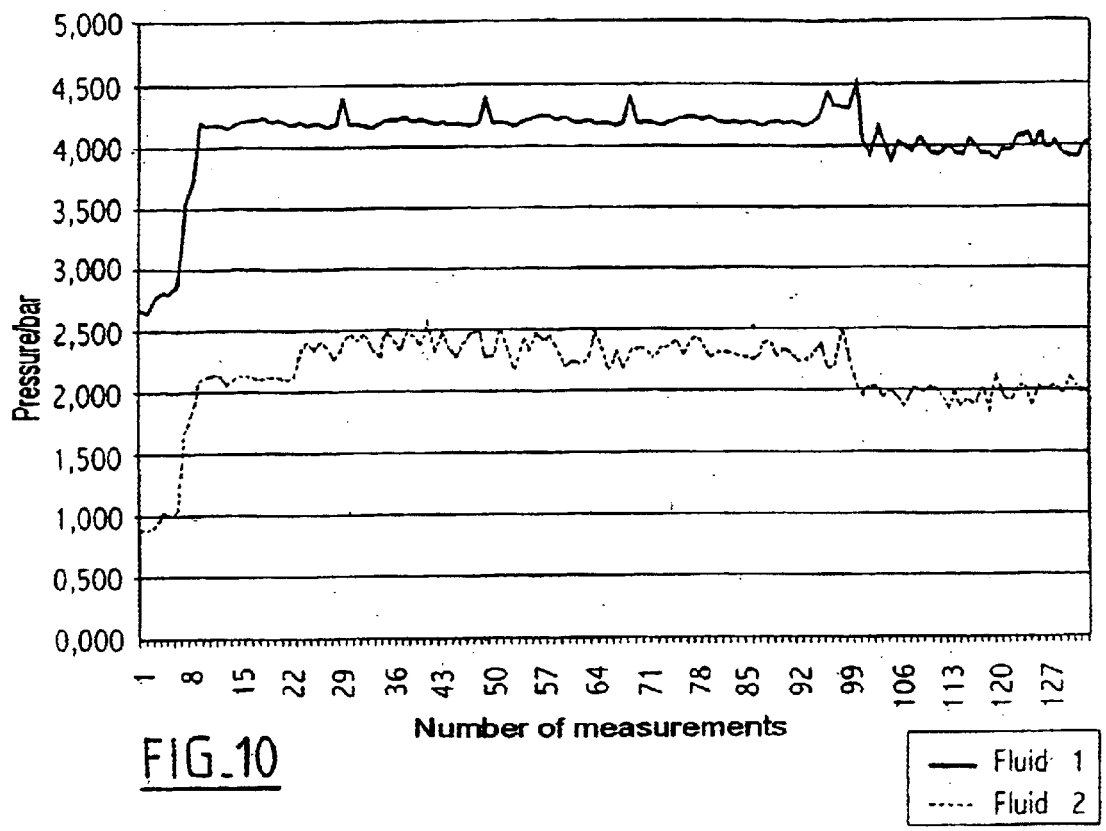
Figure 11:
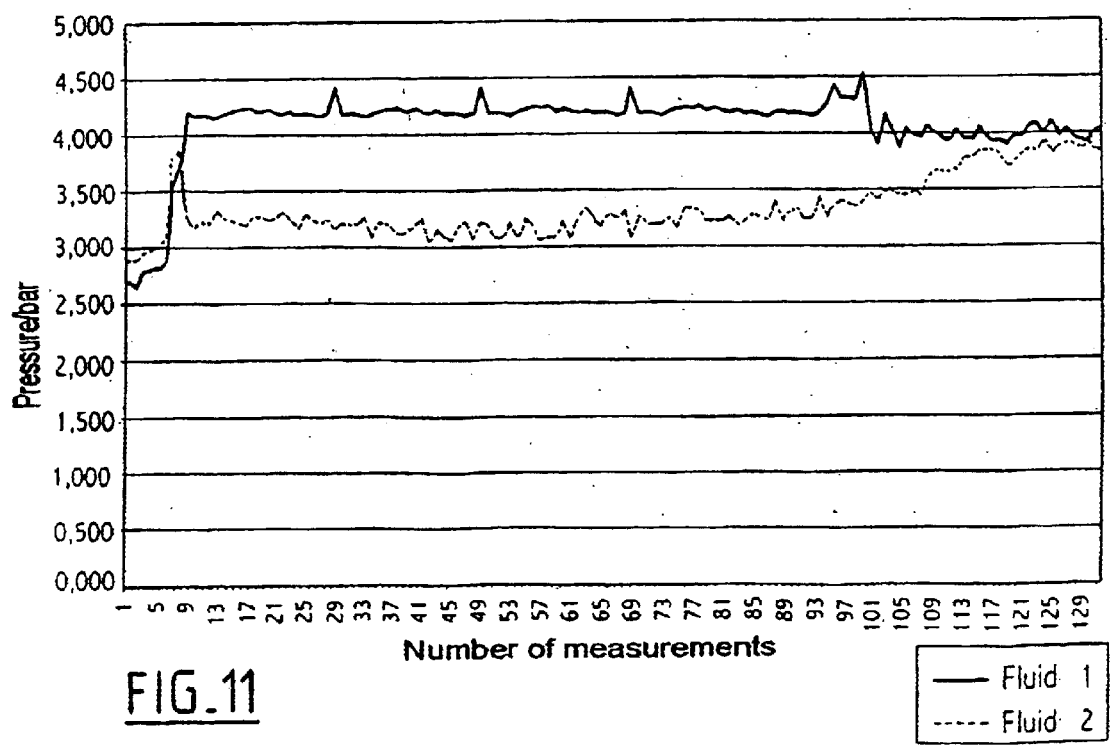

Other characteristics and advantages of the invention will become apparent from reading the description which will follow, with reference to the attached drawings in which:

FIG. 1 is a schematic perspective view of the device of the invention and, in particular, of the hydraulic and electronic modules, FIGS. 2, 3 and 4 are schematic views of the electronic module from the front, from the rear and from above, FIGS. 5 and 6 are schematic views of the hydraulic module from the front, from the rear and from above, FIGS. 7 to 9 show examples of the screen that appears on the electronic module during a test, FIGS. 10 and 11 are graphs of the curves of the pressure in the two circuits of two sections of an exchanger, the first being normal, the second showing a leak.

FIG. 1 shows a section of a plate-type exchanger 1 consisting of a supporting structure 2 supporting bundles of plates with reliefs 3 assembled side by side by joints and between them defining two adjacent circuits with respective inlets 4, 5 and outlets 6, 7 accessible on one wall of the supporting structure 2. Each plate or bundle of plates has its own inlets/outlets and the two circuits may form several sections defined according to the connections chosen for the various inlets/outlets of the plates within the exchanger.

The device of the invention is in the physical form of two modules, one electronic 10 and one hydraulic 20, each comprising a carriage supporting or containing a certain number of apparatuses.

The electronic module 10 comprises a computer processing unit connected to peripherals such as a screen 12 readable from above, a printer 13 placed in a drawer, a keyboard 14 placed in a drawer and a panel 15 of measurement, signaling or switching instruments.

The hydraulic module 20 comprises a tank 21 equipped with a pump driven by a motor 22. A connection 23 allows the hydraulic unit to be connected to a test fluid supply, advantageously a water supply. A connection box 24 has various connections 25 which can be linked selectively by hoses 26 equipped with couplings 27 to the inlets/outlets 4–7 (or others) of the section of the exchanger that is to be tested. In the example depicted, there are six pairs of connections 25 allowing the simultaneous consideration of six exchanger sections. Each of the pairs of connections is linked, in the module, to a pressure sensor which makes it possible constantly to determine the pressure in the two circuits of the various sections.

The software incorporated into the processing unit of the electronic module allows the configuration of the inputs/outputs defining the sections to be taken into consideration, for example in the form depicted in FIG. 7 which shows one of the screens that appear during the test. This screen shows the four plates 3 of the exchanger with their inlets/outlets identified by a code. The table 30 shows precisely what the inlets/outlets of the three sections defined in this example are.

On the basis of this configuration input by the user by way of data, the software deduces what connections need to be made in order to carry out the test in the various sections and these connections are indicated by the screen visible in FIG. 8, indicating where each of the hoses 26 of the hydraulic module need to be connected to.

Once these connections have been made, the test is initiated from the electronic module, having beforehand set the desired pressure values. The test pressure is advantageously higher than the operating pressure to make sure that any cracks that are forming open up; for example, the former is 5 to 15 bar whereas the latter is 3 to 10 bar. The differential pressure to be established between the two circuits is also set, for example at between 2 and 5 bar, and the pressure hold is also set, for example to 20 minutes. The values of the pressure of the fluid in the two circuits of all the sections considered (for example three sections) are simultaneously and constantly measured (or are measured at closely spaced intervals), thus making it possible for each section to establish a graph of the two pressure curves. The software simultaneously calculates the pressure difference between the two curves for each time interval and signals any appreciable convergence (that is to say any convergence below a predefined threshold), or any crossing of the curves by an indication that can be read on the screen, in boxes 31; if there is no critical convergence, that is also signaled. Buttons 32 allow access to the graph itself, if so wished, this being of the type shown in FIG. 10 or 11 which respectively represent the case where there is no appreciable convergence and a case where there is critical convergence (and therefore leakage).

It can therefore be deduced from the results of the test that section 2 of the exchanger has a leak.

What is claimed is:

1. A method for detecting a leak between the two circuits of a plate-type exchanger (1), of the type in which each of the two circuits is filled with fluid at a different pressure, characterized in that the change in pressure in the two circuits is observed and in that a converging of the pressures observed in the two circuits below a certain threshold is automatically monitored and in that a leak detected when said convergence has been detected is signaled, observation involving periodically calculating the difference between the two pressures, the leak being signaled when this difference drops below a certain threshold.

2. The method as claimed in claim 1, characterized in that several sections are defined in the two circuits according to the connections of the inlets/outlets of the plates of the exchanger (1), and in that several sections of the exchanger (1) are tested simultaneously.

3. The method as claimed in claim 2, characterized in that the connections to be made with a hydraulic test module to simultaneously test said several sections are automatically indicated.

4. A device for detecting a leak between the two circuits of a plate-type exchanger (1), of the type comprising means for filling each of the two circuits with fluid at a different pressure, characterized in that it comprises means for automatically monitoring the convergence of the pressures in the two circuits with respect to a given threshold, and means for signaling a leak in function when the automatic monitoring means have noticed said convergence, said monitoring means comprising means for measuring the differential pressure.

5. The device as claimed in claim 4, characterized in that it comprises a hydraulic module (20) and an electronic module (10) which are separate, the hydraulic module comprising a number of connections (25) for connecting to a number of inlets/outlets (4–7) of the plate-type exchanger (1) so that several sections of the exchanger can be tested simultaneously.

6. The device as claimed in claim 5, characterized in that the electronic module (10) contains software for exploiting the pressure measurements determined at the connections (25) of the hydraulic module (20).

7. The device as claimed in claim 6, characterized in that the software indicates, on the basis of the configuration of the sections, which configuration is input as data, what connections are to be made at the connections (25) in order to take the measurements.

* * * * *